United States Patent [19]

Abe et al.

[11] 4,448,173

[45] May 15, 1984

[54] FUEL EVAPORATOR

[75] Inventors: Seiko Abe, Kariya; Kazuhide Watanabe, Toyohashi, both of Japan

[73] Assignee: Nippon Soken, Inc., Nishio, Japan

[21] Appl. No.: 469,715

[22] Filed: Feb. 25, 1983

[30] Foreign Application Priority Data

Mar. 10, 1982 [JP] Japan .................................. 57-37419

[51] Int. Cl.$^3$ ............................................ F02M 31/00
[52] U.S. Cl. .................................... 123/549; 123/552; 219/206; 261/142
[58] Field of Search ............... 123/549, 552, 545, 546; 219/205, 307, 206, 374, 207, 375, 381, 382, 505; 261/142; 338/22 R

[56] References Cited

U.S. PATENT DOCUMENTS

| | | |
|---|---|---|
| 4,108,125 | 8/1978 | Marcoux et al. |
| 4,141,327 | 2/1979 | Marcoux et al. |
| 4,279,234 | 7/1981 | Marcoux ............................ 123/549 |
| 4,308,845 | 1/1982 | Sarto ................................. 123/549 |
| 4,361,125 | 11/1982 | Igashira ............................. 123/549 |
| 4,377,148 | 3/1982 | Ishida ................................ 123/549 |
| 4,384,563 | 5/1983 | Siefer ................................ 123/549 |
| 4,387,690 | 6/1983 | Chiararoli ......................... 123/549 |

*Primary Examiner*—Ronald H. Lazarus
*Attorney, Agent, or Firm*—Cushman, Darby & Cushman

[57] ABSTRACT

A fuel evaporator to be installed between a carburetter and an intake manifold of an internal combustion engine for heating an air-fuel mixture flowing through an air-fuel passage of the carburetter is disclosed. The fuel evaporator comprises at least one ceramic heater formed of a circular PTC ceramic plate having honeycomb-shaped open passages, and at least one electrically conductive metallic plate having honeycomb-shaped open passages of which shape and arrangement are equal to those of the open passages of the PTC ceramic plate. The metallic plate is disposed on one surface or both surfaces of the ceramic heater so that the open passages of the metallic plate are coaxial with those of the ceramic heater. The ceramic heater and the metallic plate are disposed on a stepped portion formed in an insulator and the outer peripheral portion of the metallic plate is fixed to the insulator which is interposed between the carburetter and the intake manifold. The edge portion of the metallic plate, defining at least one open passage is bent in the axial direction thereof and closely inserted into the corresponding open passage of the ceramic heater.

22 Claims, 6 Drawing Figures

FUEL EVAPORATOR

BACKGROUND OF THE INVENTION

The present invention relates to a fuel evaporator to be installed between a carburetter and an intake manifold of an internal combustion engine for heating an air-fuel mixture flowing through an air-fuel passage of the carburetter. The above described fuel evaporator is provided with a honeycomb-shaped ceramic heater made of semi-conductive material having a positive temperature coefficient of resistance. The ceramic heater is disposed on a stepped portion formed in an insulator which is interposed between the carburetter and the intake manifold. Conventionally, in such a fuel evaporator, a square PTC ceramic plate has been generally used, since the square ceramic plate can be closely fit in the square stepped portion of the insulator without slipping on the insulator during operation.

However, in this case, four corners of the square stepped portion project from the air-fuel passage outward to approach four holes through which bolts are inserted for fixing the fuel evaporator to the carburetter and the intake manifold.

As a result, a large sealing surface cannot be obtained between the bolt holes and the stepped portion so that sealing effect of the fuel evaporator remarkably lowers.

By employing a ceramic heater having a circular outer shape, the above described problem can be overcome. However, since the circular heater is disposed in a stepped portion having a circular cross section, which is formed in the insulator, the circular ceramic heater is apt to slip relative to the insulator due to vibrations of an engine so that the circular ceramic heater is damaged.

Therefore, the circular ceramic heater is inferior in durability.

Accordingly, one object of the present invention is to provide a fuel evaporator for an internal combustion engine having excellent durability, which can be installed in a limited space with excellent sealing effect.

Another object of the present invention is to provide a fuel evaporator for an internal combustion engine, having a ceramic heater which is surely fixed to an insulator during operation.

Still another object of the present invention is to provide a fuel evaporator for an internal combustion engine, having a ceramic heater which is free from damage such as cracks.

SUMMARY OF THE INVENTION

The fuel evaporator of the present invention comprises at least one ceramic heater formed of a circular PTC ceramic plate having honeycomb-shaped open passages, and at least one electric conductive metallic plate having honeycomb-shaped open passages of which shape and arrangement are equal to those of the open passages of the PTC ceramic plate.

The metallic plate is disposed on one surface or both surfaces of the ceramic heater so that the open passages of the metallic plate are coaxial with those of the ceramic heater.

The ceramic heater having the above described structure and the metallic plate having the above described structure are disposed on a stepped portion formed in an insulator and the outer peripheral portion of the metallic plate is fixed to the insulator. And the insulator is interposed between a carburetter and an intake manifold and fixed thereto.

The edge portion of the metallic plate, defining at least one open passage is bent in the axial direction thereof and closely inserted into the corresponding open passage of the ceramic heater.

The ceramic heater is certainly fixed to the insulator through the metallic plate having the above described structure so that the ceramic heater is prevented from slipping on the stepped portion of the insulator due to vibrations during operation. As a result, a durable fuel evaporator having excellent sealing effect can be obtained.

DESCRIPTION OF THE PREFERRED EMBODIMENTS

Figure 1:
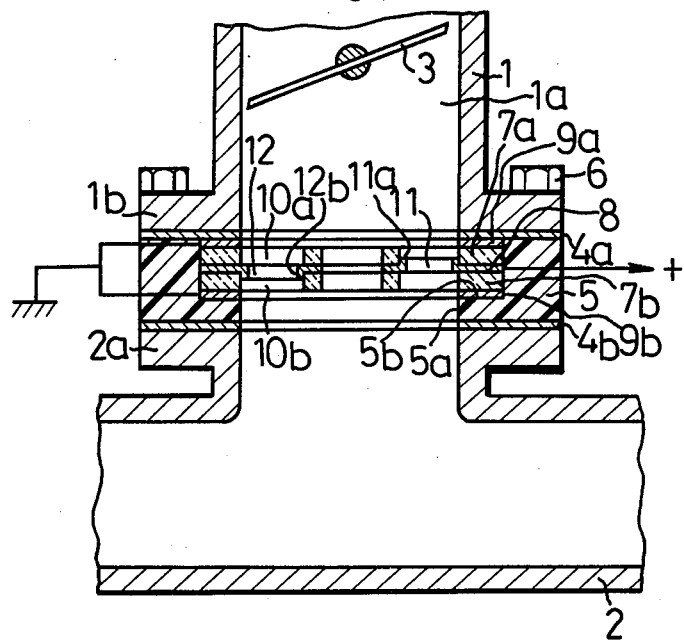
FIG. 1 is a longitudinal sectional view of a first embodiment of the fuel evaporator according to the present invention.
Figure 2:
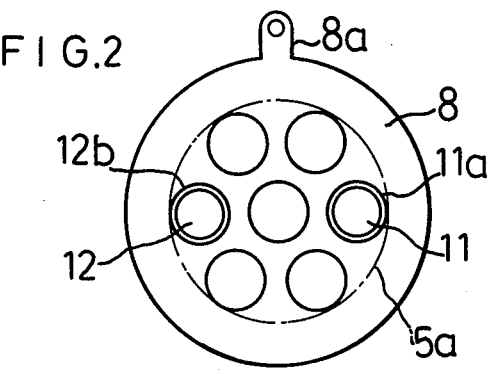
FIG. 2 is a view illustrating a metallic plate employed in the first embodiments.

Hereinafter, the present invention will be explained in accordance with several embodiments with reference to the drawings.

FIGS. 1 to 5 illustrate a first embodiment of the fuel evaporator according to the present invention.

A carburetter 1 is provided with an air-fuel passage 1a having a circular cross section. A throttle valve 3 is provided in the passage 1a. In the lower end of the carburetter 1, a square-shaped flange 1b is formed.

In the upper end of an intake manifold 2, a flange 2a having the same shape as that of the flange 1b of the carburetter 1 is formed. These flanges 1b, 2a are connected to each other in four corners through an upper gasket 4a, an insulator 5 and a lower gasket 4b by bolts 6. Each gasket 4a or 4b has the same outer shape as that of the flange 1b or 2a.

In the central portion of the insulator 5, a circular opening 5a having the same diameter as that of the air-fuel passage 1a of the carburetter 1 is formed so as to be coaxial with the air-fuel passage 1.

In the insulator 5, an annular stepped portion 5b is formed so as to be coaxial with the opening 5a.

On the stepped portion 5b, two pieces of plate-shaped ceramic heaters 7a, 7b are disposed in layers.

Between the ceramic heaters 7a, 7b, a circular metallic plate 8 having the same diameter as that of the outer diameter of the stepped portion 5b, is interposed. Contacted with the outer peripheral portion of the upper surface of the ceramic heater 7a and the under surface of the ceramic heater 7b, are respectively ring-shaped negative electrode plates 9a, 9b having the same outer diameter as that of the stepped portion 5b. With the upper surface of the negative electrode plate 9a, the gasket 4a contacts.

The insulator 5 is formed of thermally and electrically insulating material such as phenol resin or epoxy resin.

The metallic plate 8 is formed of electrically conductive metal such as copper, and aluminum, and is provided with a leg protion 8a which projects from the outer periphery thereof.

The negative electrode plates 9a, 9b are formed of electrically conductive metal such as copper and aluminum like the metallic plate 8.

The ceramic heaters 7a, 7b are provided with a plurality of circular open passages 10a, 10b having a diameter equal to each other. They are disposed so that the open passages 10a, 10b are coaxially aligned.

The metallic plate 8 is provided with open passages 11, 12 so as to be coaxial with the open passages 10a, 10b of the ceramic heaters 7a, 7b. The edge portion 11a defining the open passage 11 is bent upward while the edge portion 12b defining the open passage 12 is bent downward. And the edge portions 11a, 12b are closely inserted into the corresponding passages of the ceramic heaters 7a, 7b, respectively.

Figure 3:
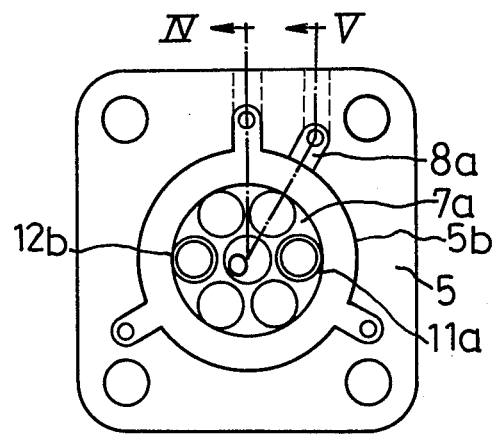
FIG. 3 is a view illustrating the structure for fixing the metallic plate and ceramic heaters to an insulator of the first embodiment.
Figure 4:
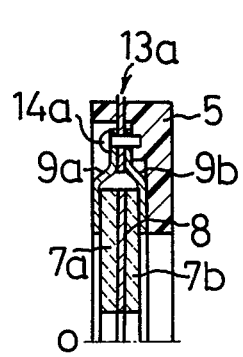
FIG. 4 is a sectional view taken along the line 0-IV of FIG. 3.

As shown in FIGS. 3 and 4, the negative electrode plates 9a, 9b are fixed to the insulator 5 together with an electrode terminal 13 a by a rivet 14a. The electrode terminal 13a is grounded.

Figure 5:
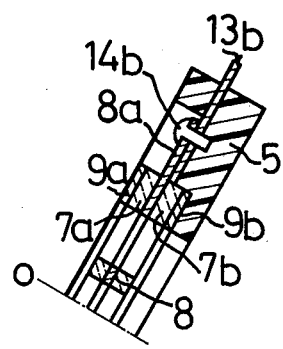
FIG. 5 is a sectional view taken along the line 0-V of FIG. 3.

As shown in FIGS. 3 and 5, the leg portion 8a of the metallic plate 8 is fixed to the insulator 5 together with an electrode terminal 13b by a rivet 14b. The electrode terminal 13b is connected to a battery (not shown) through a switch (not shown). In this embodiment, the metallic plate 8 operates as a positive electrode plate.

In operation, when the switch is turned on, a voltage of the battery is applied to the electrode terminal 13b. An electric current flows from the electrode terminal 13b to the ceramic heater 7a, 7b by way of the metallic plate 8. After flowing through the ceramic heaters 7a, 7b, the electric current is grounded by way of the negative electrode plates 9a, 9b.

Upon receiving an electric current, the ceramic heaters 7a, 7b are instantaneously heated to their Curie temperature and thereafter the ceramic heaters 7a, 7b are maintained to about their Curie temperature.

The air-fuel mixture supplied from the carburetter 1 to the intake manifold 2, passes the open passages 10a, 10b of the ceramic heaters 7a, 7b. At this time, the air-fuel mixture is heated by the ceramic heaters 7a, 7b.

As described above, in the first embodiment, two plate-shaped circular ceramic heaters having honeycomb-shaped open passages, respectively are stacked on the stepped portion of the insulator. A metallic plate provided with open passages having the same shape and size as those of the open passages of the ceramic heaters is interposed between two ceramic heaters. The edge portions of the metallic plate, defining at least two open holes thereof is bent upward or downward and the bent edge portions are closely inserted into the open passages of the ceramic heaters.

Since the metallic plate having the above described structure is interposed between the ceramic heaters, the open passages of two ceramic heaters can be coaxially arranged. And two ceramic heaters can be integrally fixed to the insulator through the metallic plate without slipping on each other during operation.

Therefore, the ceramic heaters can be prevented from being damaged during the operation of the fuel evaporator so that the durability of the ceramic heaters can be improved.

Furthermore, since the ceramic heater is reinforced by the metallic plate, each ceramic heater can be made thin without decreasing its strength.

Figure 6:
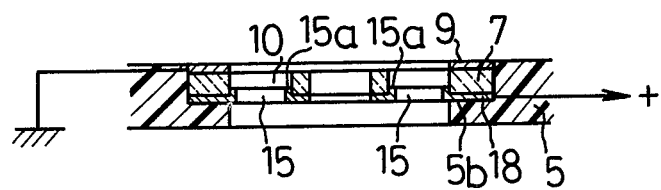
FIG. 6 is a longitudinal sectional view of a main part of a second embodiment of the fuel evaporator according to the present invention.

FIG. 6 illustrates a second embodiment of the fuel evaporator according to the present invention.

In the second embodiment, one piece of ceramic heater 7 is employed. The ceramic heater 7 has the same structure as that of the ceramic heaters 7a, 7b of the first embodiment.

On the stepped portion 5b formed in the insulator 5, a metallic plate 18 which is connected to a battery, the ceramic heater 7 and a negative electrode plate 9 are stacked.

The metallic plate 18 has the same structure as that of the metallic plate of the first embodiment except that both of the edge portions 15a defining the open passages 15 of the metallic plate 18 are bent upward in the second embodiment.

The bent edge portions 15a are inserted into the corresponding open passages 10 of the ceramic heater 7.

The metallic plate 18 is fixed to the insulator 5 in a leg portion projecting from the outer periphery thereof like the first embodiment.

Therefore, the ceramic heater 7 can be certainly fixed to the insulator 5 through the metallic plate 18.

The other structure of the fuel evaporator of the second embodiment is substantially equal to that of the first embodiment.

As described above, the fuel evaporator of the present invention comprises at least one ceramic heater formed of a circular PTC ceramic plate provided with honeycomb-shaped open passages, and at least one electrically conductive metallic plate having honeycomb-shaped open passages of which shape and size are equal to those of the open passages of the ceramic heater. The metallic plate is disposed on one or both surfaces of the ceramic heater so that the open passages of the metallic plate are coaxial with those of the ceramic heater. The edge portion defining at least one open passage of the metallic plate is bent upward or downward and is closely inserted into the corresponding open passage of the ceramic heater. The metallic plate is fixed to the insulator in the outer peripheral portion thereof.

According to the fuel evaporator of the present invention, since the circular ceramic heater is employed, the ceramic heater can be installed in a limited space with excellent sealing effect. Since the ceramic heater is fixed to the insulator through the metallic plate which is closely engaged with the ceramic heater, the circular ceramic heater does not slip relative to the insulator due to the vibrations of an engine. Therefore, the ceramic heater is prevented from being damaged.

Furthermore, since the ceramic heater is reinforced by the metallic plate, the ceramic heater can be made thin so that the material for the ceramic heater can be reduced.

The present invention is not limited to the above described embodiments. In addition, following modified embodiments are also possible.

In the first embodiment, the annular negative electrode plate 9b is disposed in contact with the under surface of the lower ceramic heater 7b.

Figure 7:
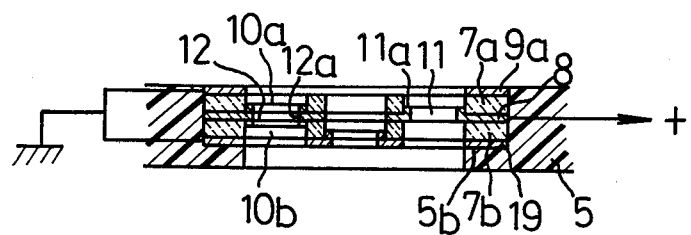
FIG. 7 is a longitudinal sectional view of a main part of a modified embodiment of the fuel evaporator according to the present invention.

As shown in FIG. 7, in place of the annular negative electrode plate 9b, a metallic plate 19 provided with open passages having the same shape and size as those of the open passages of the metallic plate 8 can be employed as a negative electrode plate.

In this case, the metallic plate 19 is disposed so that the open passages of the metallic plate 19 are coaxial with those of the ceramic heater 7b. And the edge portions of the metallic plates 8 and 19, which define at least one of the open passages thereof, are bent upward.

In this modified embodiment shown in FIG. 7, the metallic plate 8 acts as a positive electrode plate and forms a parallel circuit with the negative electrode plates 9a, 19.

Instead, the metallic plate 19 can be employed as a positive electrode plate in place of the metallic plate 8. In this case, the metallic plate 8 is only used to fix the ceramic heaters 7a, 7b to the insulator 5. The metallic plate 19 and the negative electrode plate 9a form a series circuit.

Figure 8:
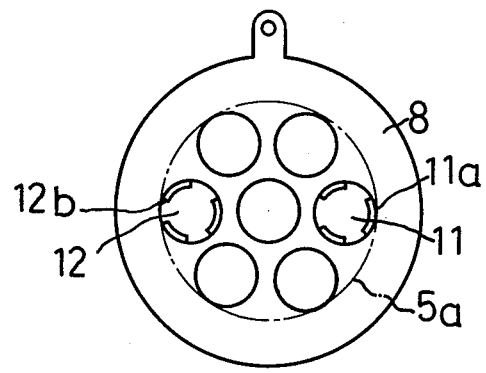
FIG. 8 is a plan view of a metallic plate employed in another modified embodiment of the fuel evaporator according to the present invention.

Furthermore, the edge portion of the metallic plate, which define the open passages thereof is bent upward or downward over the whole circumference thereof as shown in the preceding embodiments. Instead, the above described edge portion can be partially bent like claws as shown in FIG. 8. In this case, the same operational effect as that of the preceding embodiments can be obtained.

What is claimed is:

1. A fuel evaporator to be installed between a carburetter and an intake manifold of an internal combustion engine for heating an air-fuel mixture flowing through an air-fuel mixture passage of said carburetter, comprising:
   at least one circular ceramic heater made of semi-conductive material;
   said ceramic heater being provided with a plurality of open passages;
   at least one electrically conductive metallic plate provided with a plurality of open passages having the same shape and size as those of said open passages of said ceramic heater, which is disposed in contact with a surface of said ceramic heater so that said open passages of said metallic plate are coaxial with said open passages of said ceramic heater;
   an electric current supplying means for supplying an electric current to said ceramic heater;
   said electric current supplying means comprising electrode plate means having an inner diameter equal to the diameter of said air-fuel mixture passage, which is disposed in contact with said ceramic heater;
   an annular insulator made of electric insulating material for supporting said ceramic heater, said metallic plate and said electric current supplying means;
   said insulator having an inner diameter equal to the diameter of said air-fuel passage of said carburetter and being interposed between said carburetter and said intake manifold through gaskets;
   said open passages of said metallic plate being defined by edge portions, at least one of which is bent in the axial direction of said open passages of said ceramic heater and closely inserted into a corresponding open passage of said ceramic heater;
   said metallic plate being fixed to said insulator in the outer peripheral portion of said metallic plate.

2. A fuel evaporator according to claim 1, wherein:
   said insulator is provided with an annular stepped portion of which outer diameter is equal to that of said ceramic heater;
   said metallic plate and said electrode means have a circular shape of which diameter is equal to that of said ceramic heater; and
   said ceramic heater, said metallic plate and said electrode means are stacked on said stepped portion of said insulator.

3. A fuel evaporator according to claim 2, wherein:
   one plate-shaped ceramic heater is disposed on said stepped portion;
   said metallic plate is disposed in contact with the under surface of said ceramic heater;
   said edge portion of said metallic plate is bent upward; and
   said metallic plate operates as second electrode plate.

4. A fuel evaporator according to claim 2, wherein:
   at least two plate-shaped ceramic heaters are disposed on said stepped portion;
   said metallic plate is interposed between adjacent ceramic heaters and said edge portion of said metallic plate is bent upward or downward.

5. A fuel evaporator according to claim 4, wherein:
   said plate means includes first and second electrode plates and second electrode plate has an annular cross section having inner diameter equal to that of said first electrode plate and is disposed in contact with the undermost surface of said two ceramic heaters.

6. A fuel evaporator according to claim 4, further comprising:
   a third electrode plate having an annular cross section of which inner diameter is equal to that of said first electrode plate, which is disposed in contact with the undermost surface of said two ceramic heaters;
   said third electrode plate having the same polarity as that of said first electrode plate; wherein:
   said metallic plate operates as said second electrode plate.

7. A fuel evaporator according to claim 2, wherein:
   at least two plate-shaped ceramic heaters are disposed on said stepped portion;
   said metallic plates are disposed between adjacent ceramic heaters and in contact with the undermost surface of said ceramic heater;
   said edge portions of said metallic plates are bent upward;
   one of said metallic plates disposed between adjacent ceramic heaters acts as said second electrode plate; and
   said metallic plate disposed in contact with said undermost surface of said ceramic heaters acts as a third electrode plate having the same polarity as that of said first electrode.

8. A fuel evaporator according to claim 2, wherein:
   said metallic plate is provided with a leg portion which projects from the outer periphery thereof outward; and
   said leg portion is fixed to said insulator.

9. A fuel evaporator according to claim 1, wherein:
   said edge portion of said metallic plate is bent over the whole circumference of said open passage.

10. A fuel evaporator according to claim 1, wherein:
    said edge portion of said metallic plate is partially bent like claws.

11. A fuel evaporator according to claim 1, wherein:

said open passages of said ceramic heater, and said metallic plate have a circular cross section, respectively.

12. A fuel evaporator according to claim 1, wherein: said metallic plate is formed of copper or aluminum.

13. A fuel evaporator for an internal combustion engine comprising: a circular ceramic heater having a plurality of open passages;
a pair of positive and negative electrode plates;
each having a plurality of holes to be aligned with said open passages;
said ceramic heater being interposed between said positive and negative electrode plates, and
an insulator fixed to an intake manifold of an engine, said positive electrode plate being held by said insulator;
wherein:
a projection is formed on at least one of said positive and negative electrode plates and at a portion of one of said holes,
said projection protruding into one of said open passages of said ceramic heater,
whereby relative movement between the ceramic heater and said pair of electrode plates is prevented.

14. A fuel evaporator for an internal combustion engine comprising:
circular ceramic heater means having a plurality of open passages;
plate means disposed on opposite sides of said heater means and including a pair of positive and negative electrode plates;
at least a portion of said plate means having a plurality of holes to be aligned with said open passages;
at least a portion of said ceramic heater means being interposed between said positive and negative electrode plates; and
an insulator fixed to an intake manifold of an engine, one of said electrode plates being held by said insulator;
at least one of said holes in said plate means being defined by a projection which protrudes into a corresponding aligned one of said open passages of said ceramic heater means for preventing relative movement between the ceramic heater means and said plate means.

15. Apparatus as in claim 14 wherein:
said heater means includes two superposed circular heaters each with said open passages,
said plate means includes a third plate which is metallic and
at least one of said three plates has said plurality of holes aligned with said open passages,
one of said three plates being disposed between said two heaters,
the said opposite sides of said heater means being the outer sides of the said two heaters respectively on which the other two plates are respectively disposed.

16. Apparatus as in claim 15 wherein one of said other two plates is one of said positive and negative plates.

17. Apparatus as in claim 16 wherein it is said third plate which is interposed between said heaters.

18. Apparatus as in claim 15 wherein one of said other two plates is said negative plate.

19. Apparatus as in claim 18 wherein the other of said two plates is the said third plate which is also a negative plate and said positive plate is the one which is interposed between said two heaters.

20. Apparatus as in claim 15 wherein said third plate is the one disposed between said two heaters and has said aligned holes two of which are defined by a respective said projection one of which protrudes into a corresponding aligned passage in one of said heaters and the other of which protrudes into a corresponding aligned hole in the other of said heaters.

21. Apparatus as in claim 15 wherein one of said positive and negative plates is the one disposed between said two heaters and has said aligned holes at least one of which is defined by said projection protruding into a corresponding aligned passage in one of said heaters.

22. Apparatus as in claim 21 wherein another one of said three plates also has aligned with said heater passages a plurality of holes at least one of which is defined by a projection protruding into a corresponding aligned passage in the other of said heaters.

* * * * *